(12) United States Patent
Nagayama et al.

(10) Patent No.: US 7,642,680 B2
(45) Date of Patent: Jan. 5, 2010

(54) ROTARY ELECTRICAL MACHINE

(75) Inventors: Takashi Nagayama, Kanagawa-ken (JP); Masato Hashimoto, Kanagawa-ken (JP); Koji Okada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 251 days.

(21) Appl. No.: 11/429,254

(22) Filed: May 8, 2006

(65) Prior Publication Data
US 2006/0261687 A1 Nov. 23, 2006

(30) Foreign Application Priority Data
May 9, 2005 (JP) .............................. 2005-136671

(51) Int. Cl.
*H02K 9/00* (2006.01)
(52) U.S. Cl. ........................................................ 310/58
(58) Field of Classification Search .......... 310/58–60 A
See application file for complete search history.

(56) References Cited
U.S. PATENT DOCUMENTS 4,275,321 A * 6/1981 Shimamoto et al. ........... 310/59
4,554,472 A * 11/1985 Kumatani .................... 310/62
5,084,641 A * 1/1992 Saima et al. .................. 310/51
2001/0017498 A1* 8/2001 Matsuoka et al. ............. 310/90

FOREIGN PATENT DOCUMENTS

| DE | 19549204 A1 * | 7/1997 |
| JP | 58112440 A * | 7/1983 |
| JP | 06-006958 | 1/1994 |
| JP | 2002-027708 | 1/2002 |
| JP | 2003-18795 | 1/2003 |

* cited by examiner

*Primary Examiner*—Tran N Nguyen
(74) *Attorney, Agent, or Firm*—Finnergan, Henderson, Farabow, Garrett & Dunner, L.L.P.

(57) ABSTRACT

A rotary electrical machine comprises: a stator core; a rotor core arranged at the inner periphery of this stator core; a bracket connected with one end of the stator core; a first bearing arranged by means of the bracket; a frame and a housing connected with the other end of the stator core; a second bearing arranged by means of the housing; a ventilation fan provided between the rotor core and the first bearing, with vanes provided on the outside in the axial direction; a rotor shaft that is freely rotatably supported by the first bearing and second bearing; an inlet provided in the frame or the housing; and an outlet provided in the frame or the housing.

4 Claims, 6 Drawing Sheets

US 7,642,680 B2

ROTARY ELECTRICAL MACHINE

CROSS-REFERENCE TO RELATED APPLICATION

This application claims benefit of priority from Japanese Patent Application No. JP 2005-136671 filed May 9, 2005, the entire content of which is incorporated by reference herein.

BACKGROUND OF THE INVENTION

1. Field of the Invention

The present invention relates to a rotary electrical machine.

2. Description of the Related Art

In a typical rail vehicle, a rotary electrical machine is mounted on a chassis suspended below the vehicle body and the vehicle is driven by transmission of the turning effort of this rotary electrical machine to the vehicle wheels through a coupling and gearwheel device.

A totally enclosed rotary electrical machine constituting an example of a prior art rotary electrical machine is described below with reference to the drawings. FIG. 1 is a cross-sectional view of such a prior art totally enclosed rotary electrical machine.

In this specification, the longitudinal direction of the rotor shaft is defined as the axial direction.

The arrows in the Figure indicate the direction of air flow.

In the prior art totally enclosed rotary electrical machine shown in FIG. 1, a stator core 4 is provided that is restrained by a core support 4a and core support 4b, between a frame 1 provided on the side opposite to the drive side and an outer peripheral bracket 2a provided on the drive side. An inner peripheral bracket 2b is provided at the inner periphery of the outer peripheral bracket 2a and a housing 3 is provided at the inner periphery of the frame 1. A rotor shaft 7 is freely rotatably supported by bearings 5, 6 that are respectively mounted on the inner peripheral bracket 2b and housing 3. A rotor core 8 is provided in the central section in the axial direction of this rotor shaft 7. A drive side end 7a of this rotor shaft 7 extends outside the machine. A coupling is mounted on this extension. A first ventilation fan 9a is mounted on the rotor shaft 7 on the inside of the bearing 6 and a second ventilation fan 9b is mounted on the opposite side to the drive side of the rotor shaft 7 and on the inside of the bearing 5. Inlets 1a and outlets 1b are provided on the side faces of the frame 1 on the opposite side to the drive side. Through-flow passages are provided in the inner peripheral bracket 2b, the outer peripheral bracket 2a, stator 4 and frame 1. The inlets of the first ventilation fan 9a on the drive side of the rotary electrical machine form external air inlets.

The bearing of the totally enclosed rotary electrical machine is constituted by forming a minute gap between the side of the fixed member and the side of the rotary member; the interior of the rotary electrical machine is thus cut off from the outside i.e. the electrical machine is totally enclosed. External air flowing in from the inlets due to the rotation of the first and second ventilation fans 9a and 9b flows through a through-flow passage (not shown) in which the inner peripheral bracket 2b, outer peripheral bracket 2a, stator 4 and frame 1 are provided and flows out through outlets (not shown) of the frame 1. Due to this passage of external air therethrough, heat evolved by the stator core 13 and rotor bar 14 that is transmitted to the core 12 (not shown) and the frame 1 from the wall of this ventilation passage is removed by being discharged to the external atmosphere. Also, inflow of external air from the inlets 1a is produced by the rotation of the second ventilation fan 9b, thereby cooling the air in the stator core 13 and rotary electrical machine transmitted to the ventilation fan 9b.

A prior art totally enclosed rotary electrical machine constructed in this way had the advantage that there was no possibility of contamination due to deposition of dust mixed with the external air on internal portions of complex structure, since external air cannot flow into the machine, and furthermore had the advantage that a filter to remove dust was unnecessary, since there was no possibility of dust from the external air being deposited, because the cooling effected by the external air took place by passage of the external air through a ventilation passage having a simple structure.

Such a technique is to be found in Laid-open Patent Publications in Japan such as for example Japanese Laid-open Patent Publication No. 2003-18795.

However, in this prior art rotary electrical machine, the temperature of the bearings and of the grease used to lubricate these becomes high, and this made it necessary to carry out maintenance of the bearings at short intervals.

SUMMARY OF THE INVENTION

Accordingly, one object of the present invention is to provide a novel rotary electrical machine whereby efficient cooling of the bearings can be achieved.

The above object can be achieved by a rotary electrical machine constructed as follows. Specifically, the object can be achieved by a rotary electrical machine comprising:

a stator core;

a rotor core arranged at the inner periphery of this stator core;

a bracket connected with one end of the stator core;

a first bearing arranged by means of this bracket;

a frame and a housing connected with the other end of the stator core;

a second bearing arranged by means of this housing;

a ventilation fan provided between the rotor core and said first bearing, with vanes provided on the outside in the axial direction;

a rotor shaft that is freely rotatably supported by the first bearing and a second bearing;

an inlet provided in the bracket;

an outlet provided in the bracket; and a partition provided on the bracket further towards the outer periphery and further towards the middle in the axial direction than the inlet;

wherein external air flowing in from the inlet flows through the vicinity of the first bearing and flows out from the outlet.

Furthermore, the above object can be achieved by a rotary electrical machine constructed as follows. Specifically, the object can be achieved by a rotary electrical machine comprising:

a stator core;

a rotor core arranged at the inner periphery of this stator core;

a bracket connected with one end of the stator core;

a first bearing arranged by means of this bracket;

a frame and a housing connected with the other end of the stator core;

a second bearing arranged by means of this housing;

a ventilation fan provided between the rotor core and a second bearing, with vanes provided on the outside in the axial direction;

a rotor shaft that is freely rotatably supported by a first bearing and the second bearing;

an inlet provided in the frame or housing;

an outlet provided in the frame or housing; and a partition provided on the frame or housing further towards the outside than the inlet;

wherein external air flowing in from the inlet flows through the vicinity of the second bearing and flows out from said outlet.

Furthermore, the above object can be achieved by a rotary electrical machine constructed as follows. Specifically, the object can be achieved by a rotary electrical machine comprising:

a stator core;

a rotor core arranged at the inner periphery of this stator core;

a frame that accommodates the rotor core and said stator core;

a first bearing arranged on the drive side by means of the frame;

a second bearing arranged on the opposite side to the drive side by means of the frame;

a rotor shaft that is freely rotatably supported by the first bearing and said second bearing;

a ventilation fan provided further towards the drive side in the axial direction than the rotor core;

an inlet provided in the frame;

an outlet provided on the opposite side on the other side of said inlet of the frame and the rotor shaft; and a partition provided further towards the outside than the inlet;

wherein external air flowing in from the inlet flows through the vicinity of the first bearing and flows out from the outlet.

Furthermore, the above object can be achieved by a rotary electrical machine constructed as follows. Specifically, the object can be achieved by a rotary electrical machine comprising:

a stator core;

a rotor core arranged at the inner periphery of this stator core;

a frame that accommodates the rotor core and said stator core;

a first bearing arranged on the drive side by means of the frame;

a second bearing arranged on the opposite side to the drive side by means of the frame;

a rotor shaft that is freely rotatably supported by the first bearing and second bearing;

a ventilation fan provided further towards the opposite side to the drive side in the axial direction than the rotor core;

an inlet provided in the frame;

an outlet provided on the opposite side on the other side of said inlet of the frame and the rotor shaft; and a partition provided further towards the outside than the inlet;

wherein external air flowing in from the inlet flows through the vicinity of the second bearing and flows out from the outlet.

In this way, a rotary electrical machine whereby the bearings can be cooled efficiently can be provided by the present invention.

BRIEF DESCRIPTION OF THE DRAWINGS

A more complete appreciation of the present invention and many of the attendant advantages thereof will be ready obtained as the same becomes better understood by reference to the following detailed description when considered in connection with the accompanying drawings, wherein.

DETAILED DESCRIPTION OF THE PREFERRED EMBODIMENTS

Figure 1:
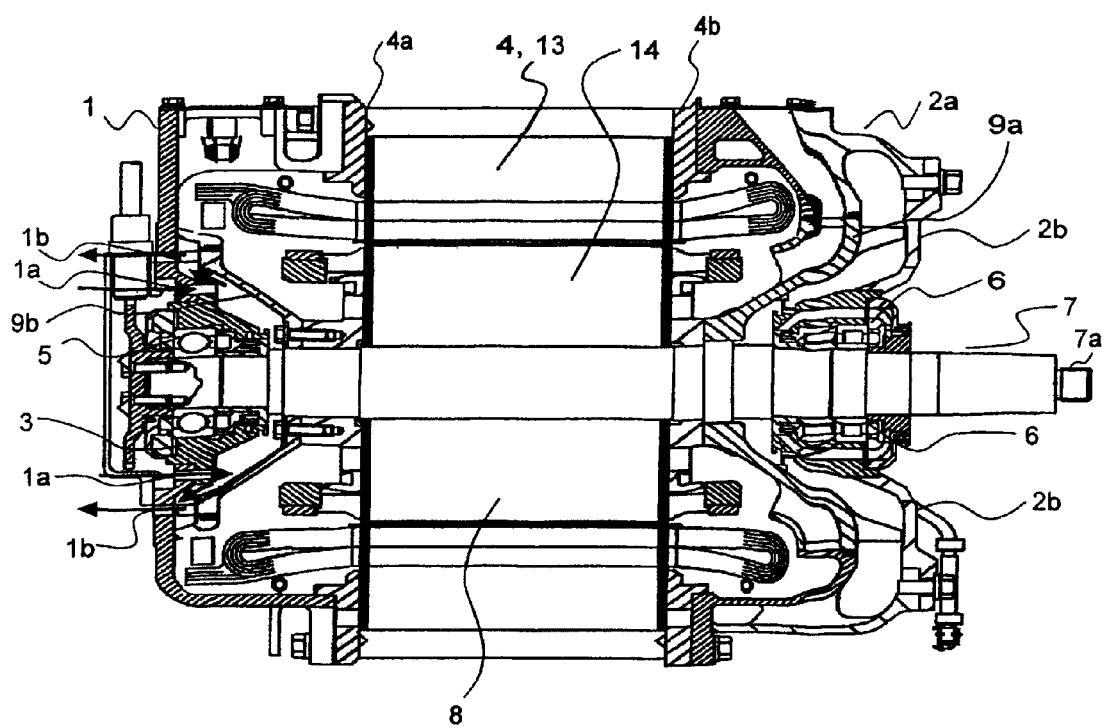
FIG. 1 is a cross-sectional view of a prior art rotary electrical machine.
Figure 2:
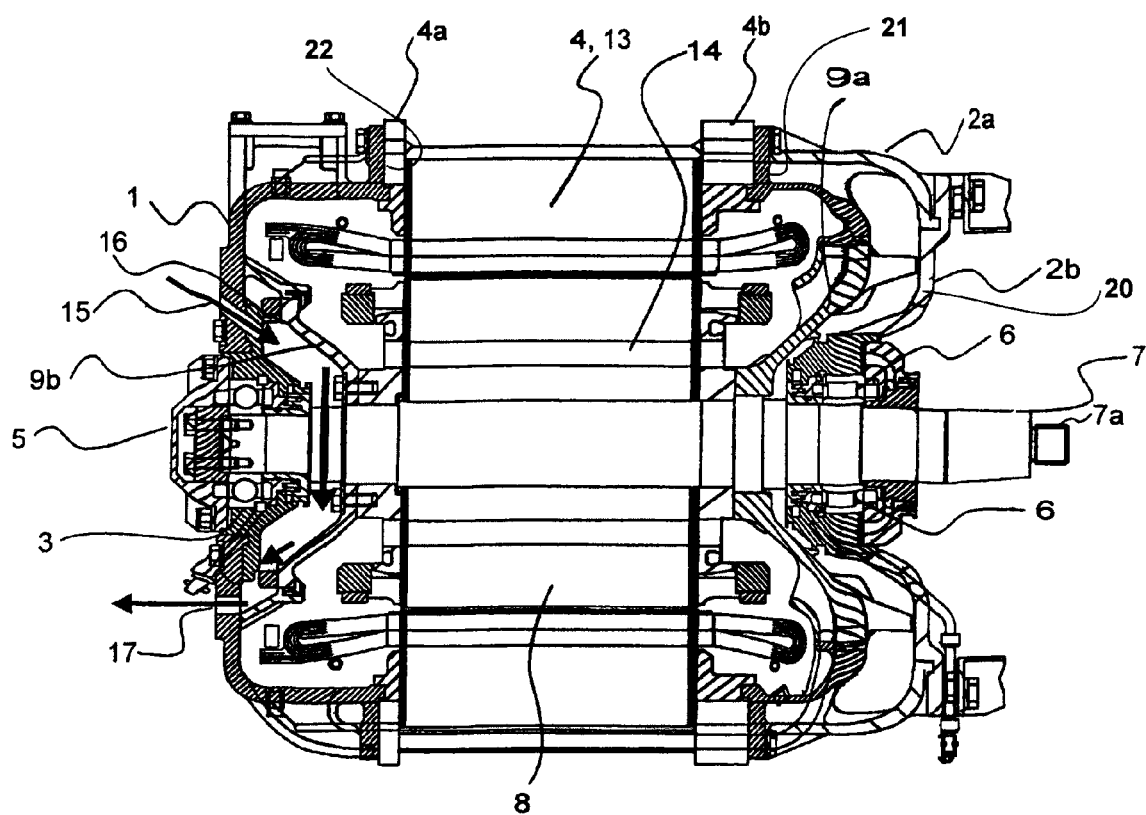
FIG. 2 is a cross-sectional view of a rotary electrical machine according to a first embodiment of the invention.

Referring now to the drawings, wherever like reference numerals designate identical or corresponding parts throughout the several views and more particularly to FIG. 2 thereof, one embodiment of the present invention will be described.

First Embodiment

Figure 3:
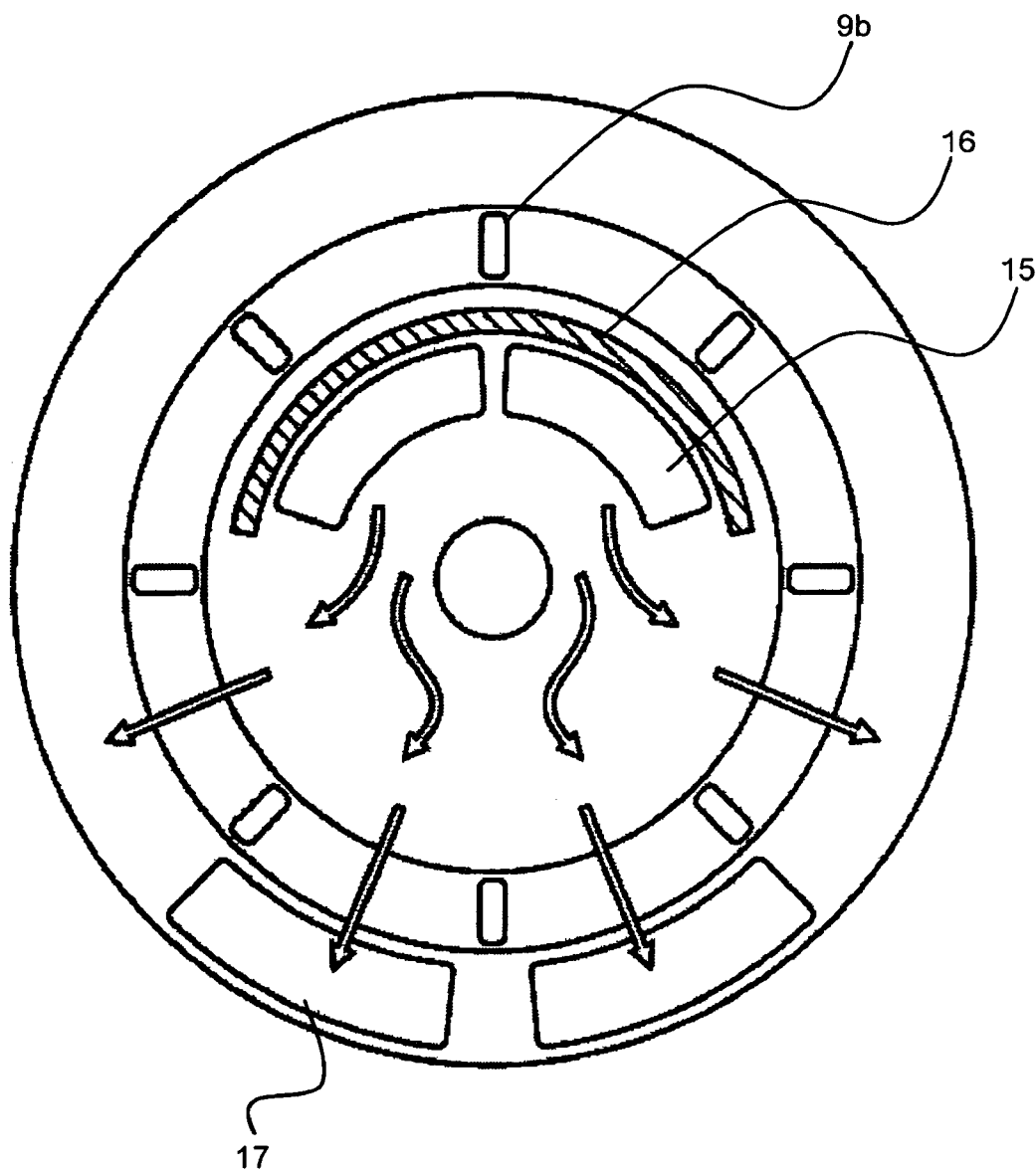
FIG. 3 is a front view of a rotary electrical machine according to a first embodiment of the invention.

A rotary electrical machine according to a first embodiment of the invention will be described in detail below with reference to the drawings. FIG. 2 is a cross-sectional view of a rotary electrical machine according to a first embodiment of the invention. FIG. 3 is a front view of a rotary electrical machine according to a first embodiment of the invention.

Figure 6:
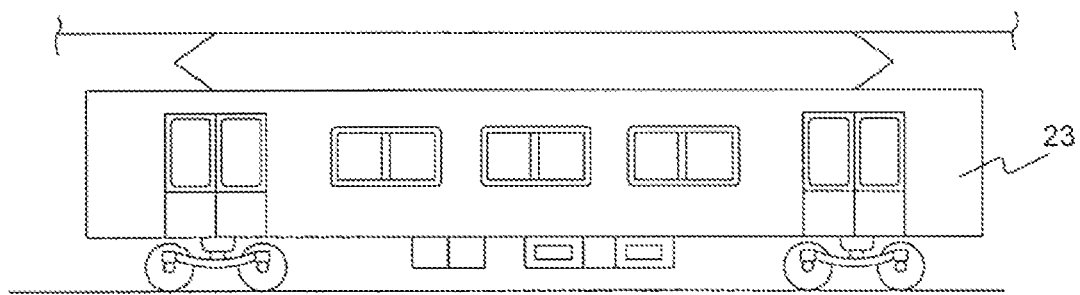
FIG. 6 is a cross-sectional view of a rail vehicle containing rotary electrical machines.

A rotary electrical machine according to a first embodiment of the invention is a totally enclosed rotary electrical machine mounted on a rail vehicle 23, as shown in FIG. 6.

In a rotary electrical machine according to a first embodiment of the invention, a stator core 4 supported by a core support 4a and core support 4b is provided between a frame 1 provided on the side opposite to the drive side and an outer peripheral bracket 2a provided on the drive side. An inner peripheral bracket 2b is provided at the inner periphery of the outer peripheral bracket 2a and a housing 3 is provided at the inner periphery of the frame 1. A rotor shaft 7 is freely rotatably support by means of bearings 5, 6 respectively mounted on the inner peripheral bracket 2b and housing 3. A rotor core 8 is arranged in the middle in the axial direction of this rotor shaft 7. The drive side end 7a of the rotor shaft 7 extends outside the machine. A coupling is mounted on this extension. A first ventilation fan 9a is mounted on the rotor shaft 7 between the bearing 6 and rotor core and a second ventilation fan 9b is mounted on the opposite side to the drive side of the rotor shaft 7 and on the inside of the bearing 5. Through-flow passages are provided in the inner peripheral bracket 2b, outer peripheral bracket 2a, stator 4 and frame 1. The flow of air is indicated by arrows.

The inlets of the first ventilation fan 9a and a first inlet 20 on the drive side of the rotary electrical machine form external air inlets. Second inlet 15 is provided at the top in the vertical direction of the frame 1 and housing 3 and third outlet 17 is provided on the underside in the vertical direction of the housing 3 on the opposite side to the drive side. A partition 16 is provided further outside than the end face of the second inlet 15 of the housing and at the side face in the middle in the axial direction of the housing 3 (see FIGS. 2, 3, and 5).

Figure 5:
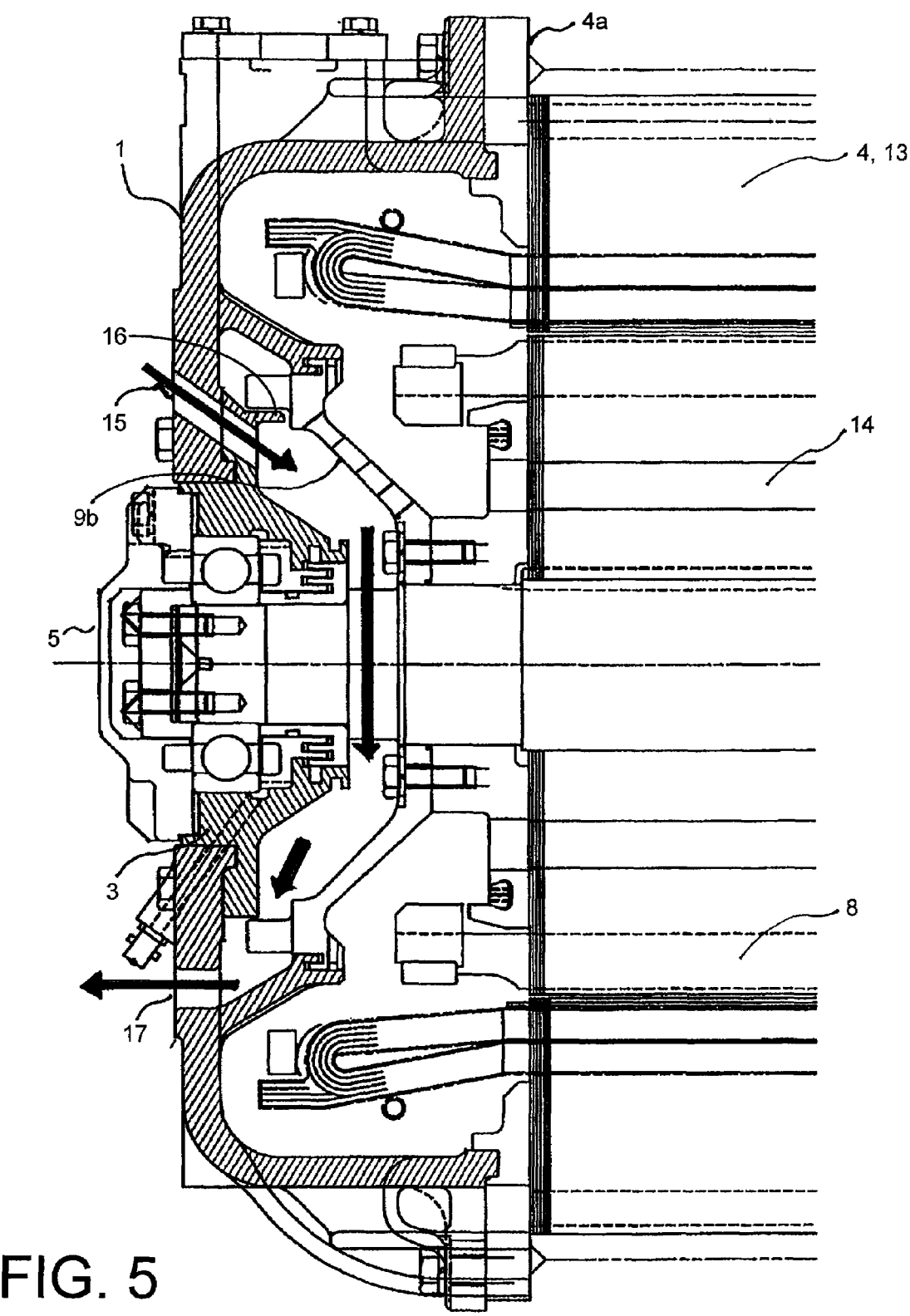
FIG. 5 is an enlarged cross-sectional view of the rotary electrical machine illustrated in FIG. 2.

During operation of a rotary electrical machine constructed in this way, the external air flowing in from the inlets of the first ventilation fan 9a due to rotation of the ventilation fans and the first inlet 20 flows through the through-flow passages (not shown) provided in the inner peripheral bracket 2b, the outer peripheral bracket 2a, stator 4 and frame 1 and flows out from first and second outlets 21 and 22, respectively, of the frame 1. By passing external air therethrough, the heat generated by the stator core 13 and rotor bar 14 that is transmitted from the side walls of these through-flow passages to the core 12 and frame 1 is removed by being released to the external air. As illustrated in FIG. 5, on the opposite side to the drive side, external air is made to flow in from the second inlet 15 by the rotation of the second ventilation fan 9b, flows through the periphery of the second bearing 5 and this external air is then discharged from the third outlet 17.

Since in a rotary electrical machine constructed in this way a partition 16 is provided in the housing 3 on the second inlet side 15, external air can be made to flow in one direction downwards from above in the vertical direction and the entire bearing can thereby be efficiently cooled.

Also, in a rotary electrical machine constructed in this way, external air is not passed through the interior of the machine, so there is no possibility of contamination due to deposition of dust mixed with the external air on portions of complex structure within the machine; furthermore, since cooling by the external air is performed of an air passage of simple construction, there is no possibility of deposition of dust from the external air thereon.

Second Embodiment

Figure 4:
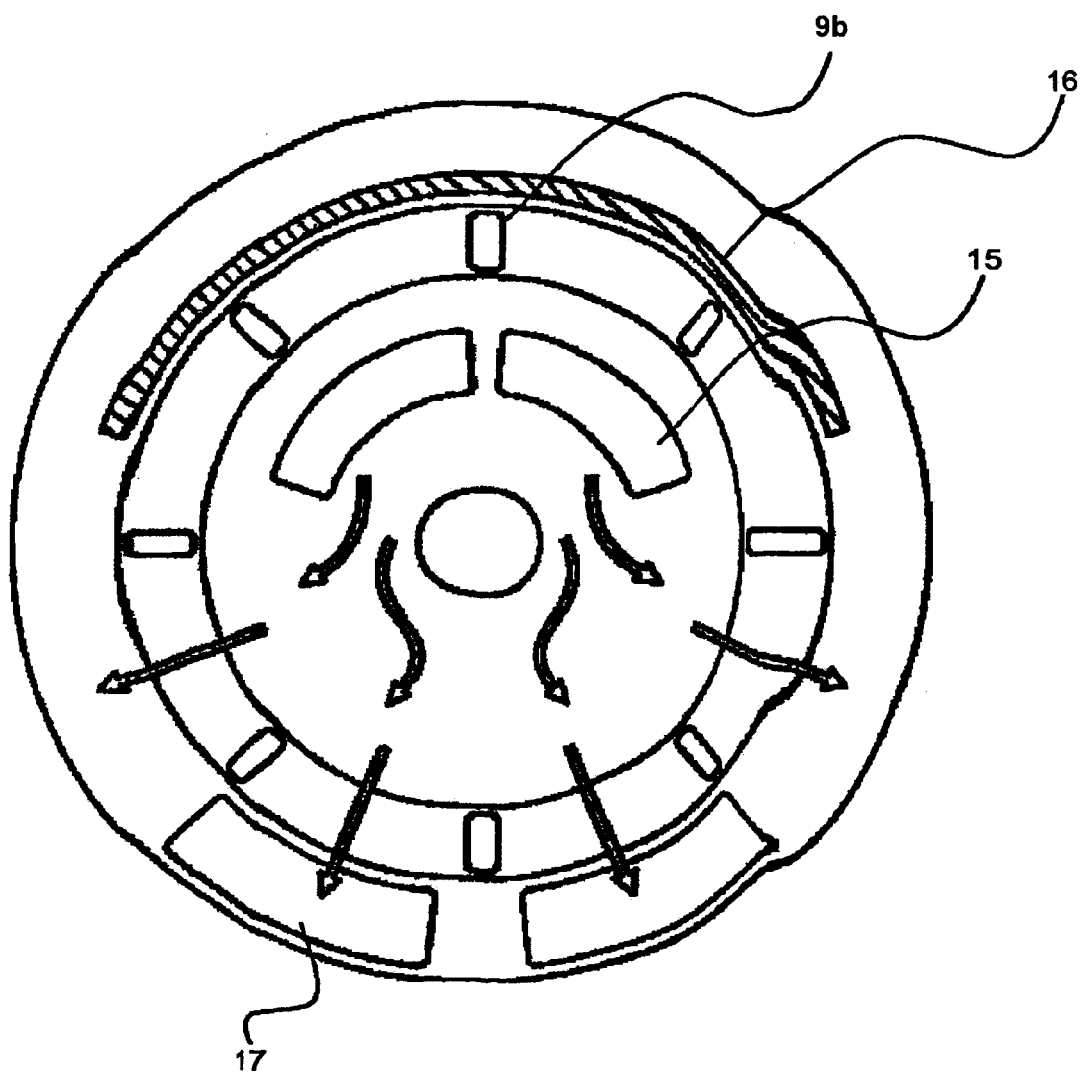
FIG. 4 is a front view of a rotary electrical machine according to a second embodiment of the invention.

A rotary electrical machine according to a second embodiment of the invention will be described in detail below with reference to the drawings. FIG. 4 is a front view of a rotary electrical machine according to a second embodiment of the invention. Parts which are structurally the same as those described with reference to FIG. 2 and FIG. 3 are given the same reference symbols and further description thereof is dispensed with.

The rotary electrical machine of the second embodiment of the invention is characterized in that the partition 16 is provided at the outer periphery of the vanes of the second ventilation fan 9b.

With a rotary electrical machine constructed in this way, in the same way as in the case of the first embodiment, external air can flow in one direction out from the second inlet 15, through the vicinity of the bearing 5 and can be discharged from the third outlet 17.

With a rotary electrical machine constructed in this way, since the partition 16 is provided in the housing 3 at the second inlet side 15, external air can flow in one direction from upstream to downstream in the vertical direction and the entire bearing can thereby be efficiently cooled.

Also, just as in the case of the rotary electrical machine of the first embodiment, in the rotary electrical machine of this embodiment also, external air is not passed through the interior of the machine, so there is no possibility of contamination due to deposition of dust mixed with the external air on portions of complex structure within the machine; furthermore, since cooling by the external air is performed of an air passage of simple construction, there is no possibility of deposition of dust from the external air thereon.

As further embodiments according to the present invention, there may be mentioned for example rotary electrical machines of an embodiment in which the invention is applied to an open type rotary electrical machine, an embodiment in which the invention is applied to a pressure fan, an embodiment in which an inlet is provided on the downstream side and an outlet is provided on the upstream side, an embodiment in which a speed sensor is provided in the vicinity of the inlet and the speed sensor is also cooled, and an embodiment in which an inlet and outlet are provided at the bearing on the drive side and external air flowing in from the inlet flows through the vicinity of the rotor shaft 7 and the vicinity of the bearing 5 before being discharged from the outlet; and rotary electrical machines in which the above construction is applied on both the drive side and the side opposite to the drive side.

It should be noted that, whereas, in the first and second embodiments of the rotary electrical machine according to the present invention, the second inlet 15 was provided above in the vertical direction and the third outlet 17 was provided below, a construction could be adopted in which the second inlet 15 is provided on the right-hand side in the left/right direction and the third outlet 17 is provided on the left-hand side; the same beneficial effect can also be obtained if the partition is provided outside the second inlet 15; the third outlet 17 may also be provided on the opposite side on the other side of the second inlet 15 and the rotor shaft 7; thus, regarding the position of the inlets and outlets, there is no particular restriction to the upper side.

What is claimed is:

1. A rotary electrical machine, comprising:
   a stator core;
   a rotor core arranged at an inner periphery of said stator core;
   a bracket connected with an end of said stator core;
   a first bearing arranged by means of said bracket;
   a frame and a housing connected with an outer end of said stator core;
   a second bearing arranged by means of said housing;
   a ventilation fan provided between said rotor core and said second bearing, with vanes provided on an outer periphery in an axial direction;
   a rotor shaft that is freely rotatably supported by said first bearing and said second bearing;
   an inlet provided on an inner periphery of said vanes of said ventilation fan in said frame and housing;
   an outlet provided on an outer periphery of said vanes of said ventilation fan, said outlet being located on a side opposite said inlet in said frame; and
   a partition provided on an outer periphery of said inlet and an inner periphery of said vanes of said ventilation fan, said partition being provided in an axial direction,
   wherein external air flowing in from said inlet flows along a side face of said frame and said housing in said axial direction and a central side of said bearing, and flows out from said outlet.

2. The rotary electrical machine according to claim 1, wherein said partition is provided further towards said outer periphery than said vanes of said ventilation fan.

3. The rotary electrical machine according to claim 1, wherein said rotary electrical machine is a totally enclosed rotary electrical machine.

4. The rotary electrical machine according to claim 2, wherein said rotary electrical machine is mounted on a rail vehicle.

* * * * *